Figure 2:
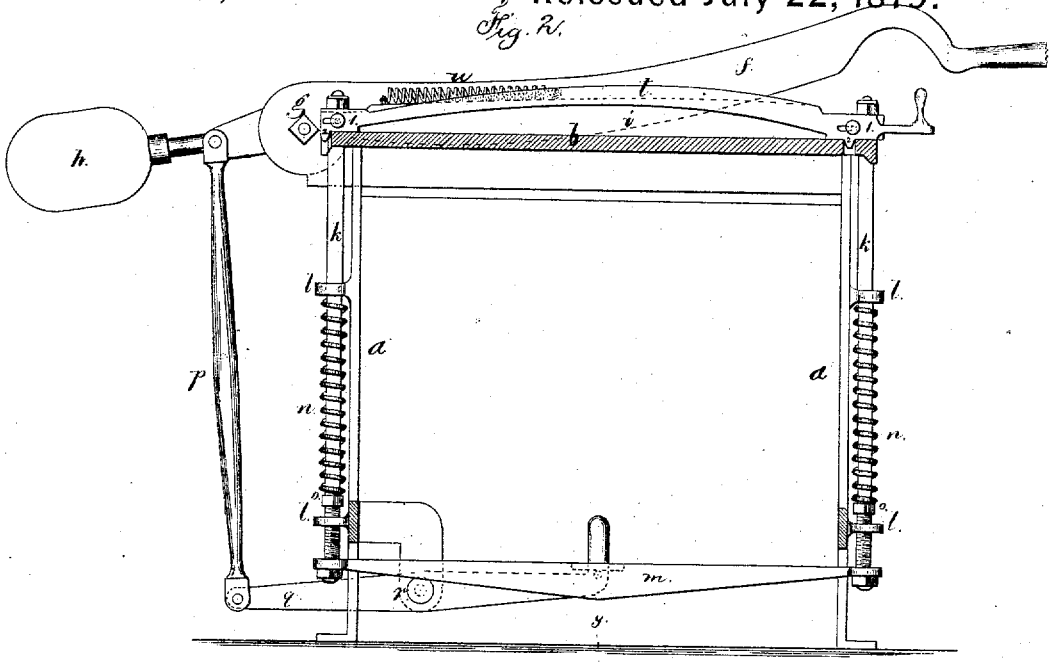

2 Sheets—Sheet 1.

C. BROMBACHER.

Shears for Cutting Paper.

No. 8,816. Reissued July 22, 1879.

Witnesses,

Chas. H. Smith

Geo. D. Maxwell

Inventor

Charles Brombacher,

Lemuel W. Serrell

N. PETERS, PHOTO-LITHOGRAPHER, WASHINGTON, D. C.

2 Sheets—Sheet 2.

C. BROMBACHER.

Shears for Cutting Paper.

No. 8,816. Reissued July 22, 1879.

Inventor

Charles Brombacher,

Lemuel W. Serrell

Atty.

Witnesses,

Chas. H. Smith

Geo. H. Maxer

N. PETERS, PHOTO-LITHOGRAPHER, WASHINGTON, D. C.

UNITED STATES PATENT OFFICE.

CHARLES BROMBACHER, OF TARRYTOWN, NEW YORK.

IMPROVEMENT IN SHEARS FOR CUTTING PAPER.

Specification forming part of Letters Patent No. 48,650, dated July 11, 1865; Reissue No. 8,816, dated July 22, 1879; application filed February 2, 1872.

*To all whom it may concern:*

Be it known that I, CHARLES BROMBACHER, of Tarrytown, in the county of Westchester and State of New York, have invented an Improvement in Shears, and the following is declared to be a correct description of the same.

In the construction of shears difficulty has heretofore been experienced in holding the material to be cut, particularly when the material is very light and flexible—such as tissue and glazed paper and woven fabrics—and where from twelve to twenty-four thicknesses are cut at one operation. Besides this, the clamping device has been actuated by a separate movement from that of the shear, requiring considerable effort and time on the part of the operator to hold with the clamp while he operated the shear, and to release the clamp while adjusting the material to be cut.

The nature of my said invention consists, first, in the combination of a stationary shear, a swinging cutter pivoted near one end and moving in a plane parallel to the stationary shear, a clamping-bar, and a lever between the moving shear and clamping-bar, whereby the clamping-bar is released near the termination of the movement of the shear or cutter; second, in the combination of a clamping-bar with a stationary and moving shear or cutter, and with mechanism connecting the shear and said clamp, so that the clamp shall be released at the termination of the movement of the cutter; third, in the formation of the clamping-bar with a portion of its edge removed adjacent to the shear, so that the material shall be held as closely to the shear as possible, and at the same time the operator is enabled to observe the action of the shear in cutting without his view being obstructed by the clamping-bar; fourth, in providing a sustaining-slide, in combination with the clamping-bar, that can be employed for keeping the said clamping-bar sufficiently elevated for the material to be cut freely to pass beneath the same, when the material is of a nature not to require the use of a clamp, or when both hands are required for adjusting the material—such as silk, flannel, &c.—to place the edge thereof against the gage; and fifth, in a movable frame, combined with the adjustable gage and shear, for sustaining light and flexible material, and preventing its sagging down while being slid across, so that its edge shall take against the gage and determine accurately the width of material cut. If this frame were not employed it would be impossible to cut pieces of flexible material of an exact size, on account of their sagging down.

Figure 1:
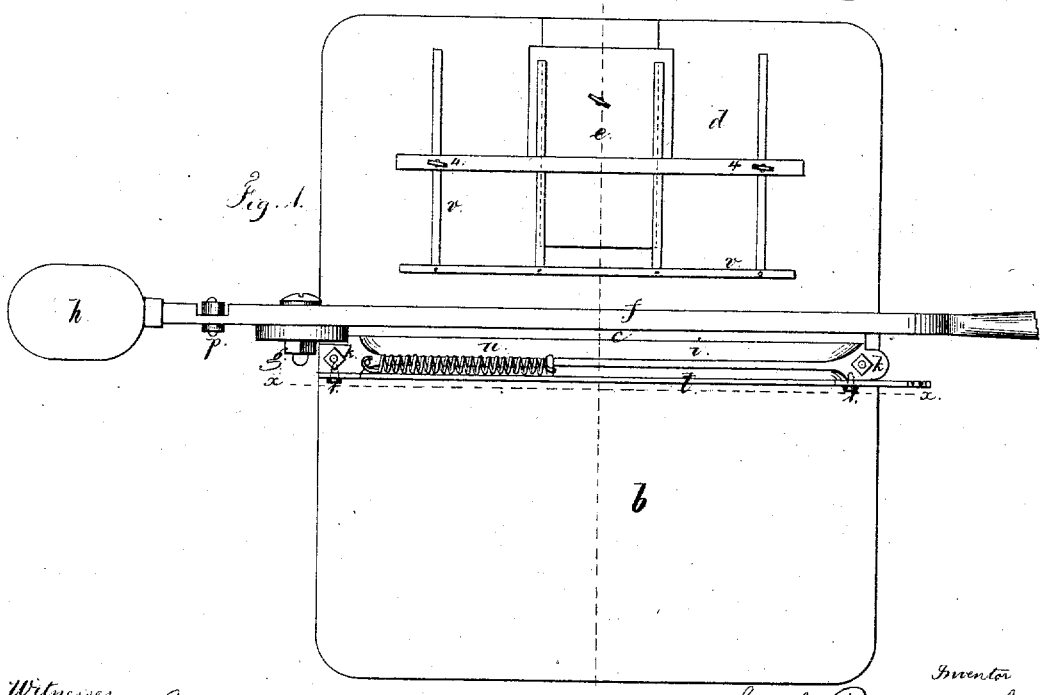
Figure 3:
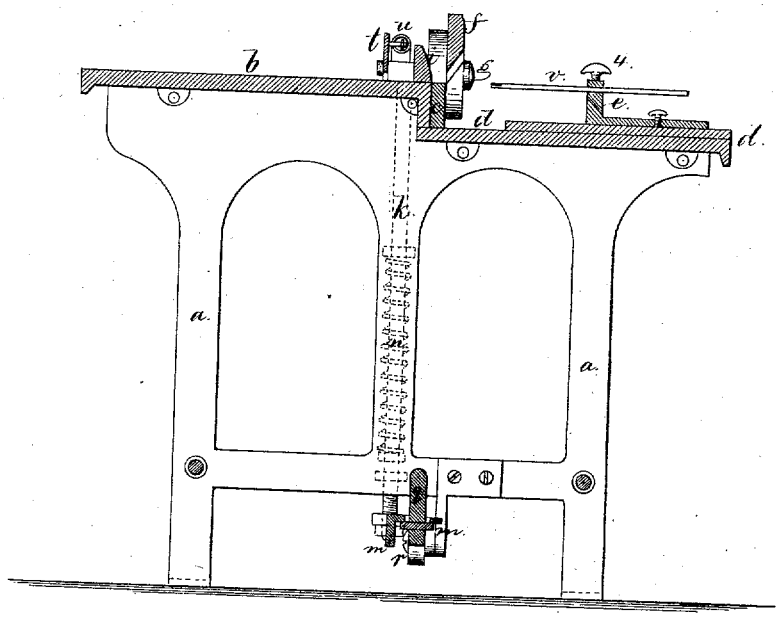

In the drawings, Figure 1 is a plan of my said shear. Fig. 2 is a longitudinal vertical section at the line *x x*, and Fig. 3 is a cross-section at the line *y y*, Fig. 1.

*a* is a frame sustaining the table *b*, at the edge of which the stationary or bed shear *c* is attached, and also the table *d*, upon which is a V-slide, sustaining the gage *e*, which is to be adjusted in any convenient manner.

The moving shear *f* is shown as jointed at *g* to the bed-shear *c*, and provided with a counter-weight, *h*, that is sufficient to prevent the shear falling. *i* is the clamping-bar, acting to hold the material to the bed *b* when placed beneath it. This clamping-bar is beveled or formed rounding upon the side next to the shear *f*. (See Fig. 3.)

In cutting material with shears of this character, it is necessary to trim the edges of said material before using the gage, otherwise the first pieces cut would not be of uniform width. In very light and soft material the clamp has to be about one-eighth of an inch from the edge of the cutter, so as to hold properly, in which case a square clamp would obstruct the light and compel the operator to guess at the width necessary to be trimmed off.

My improved beveled clamp enables the operator to see the edge of the shears and trim off only so much of the edge of the material as may be necessary. This clamping-bar may be raised by any suitable automatic device, while the material to be cut is passed beneath the same and adjusted to its position, and it is held down with the required yielding pressure to the bed.

I have shown rods *k k* at the ends of the clamping-bar *i*, passing through guides *l l* to the cross-head *m*; and *n n* are springs, adjusted in their power by nuts *o o*, said springs acting to hold the clamping-bar firmly upon any material that is introduced between said clamping-bar and the bed *b*.

The parts are so constructed and adjusted that when the stroke of the shear *c* is terminated the clamping-bar *i* shall have been raised sufficiently for the release of the material beneath said clamping-bar, so that it can be adjusted; but as the said shear or cutter is again moved the clamping-bar is liberated and acts to hold the material, so that the clamp is fully operative before the shear commences to cut. I have shown this as effected by a rod, *p*, that passes down to a lever at *q* on a fulcrum, *r*, the inner end of which acts below a projection at the center of the cross-head *m*.

Upon the side of the clamping-bar *i* is a sliding rod, *t*, with a handle at the end, and said rod is sustained by bolts 1 in slots or other suitable means, and is provided with short legs 2 2, which, when in a normal position, pass into holes in the bed *b*; but when the clamping-bar *i* is fully raised the said rod may be pulled endwise, and the legs 2 2, coming over the surface of the bed, will sustain the said clamping-bar, so that it will be inoperative.

I employ a contractile spring, *u*, that is only sufficiently strong to draw the bar *t* endwise and bring it back to a normal position when the shear *f* is raised sufficiently to relieve the ends of the legs 2 from friction on the surface of the bed *b*. This arrangement serves two purposes. One is to keep the clamp up and from operating, so as to allow the shears to work when cutting material, such as straw-boards, which do not require holding; secondly, to allow the operator to use both hands in placing material which is not stiff enough to be moved with one hand. In this case it is necessary to suspend the clamp before every operation, and to facilitate the working of this apparatus the spring *u* is attached to release the clamp after the material has been placed. The operator then taking hold of the moving cutter before bringing it down raises it slightly, which relieves the sliding bar *t*, and allows the clamp to resume its position.

The gage *e* is formed with mortises, through which the arms of the sheet-sustainer *v* pass, and screws are provided at 4 to clamp the same when adjusted to position, the object of this being to sustain the material being cut as it extends across from the bed-shear to the gage *e*, in order that accuracy in the width of thin or flexible materials may be obtained. This sustainer *v* may be sufficiently light so that its edge near the shear *c* may spring down, if necessary, with the material being cut while under the action of the moving shear *f*. Whenever the gage *e* is adjusted the sheet-sustainer *v* is also adjusted to the proper position.

I claim as my invention—

1. The combination of a stationary shear, a swinging cutter pivoted near one end and moving in a plane parallel to the stationary shear, a clamping-bar, and a lever and connection between the moving shear and clamping-bar, whereby the clamping-bar is released near the termination of the movement of the shear or cutter, substantially as set forth.

2. The combination of a stationary shear, a swinging cutter pivoted near one end and swinging in a plane parallel to the stationary shear, a lever below the bed and a support for the same, a clamping-bar, and a connection from the same to the lever, substantially as specified, so as to impart motion to the clamp only when it is to be raised, leaving it free to act independently in the other direction when not held up by the movable cutter.

3. The combination of a table, a stationary shear, a movable cutter pivoted at one end of the stationary shear, a clamping-bar arranged above the table, rods extending downwardly from said clamping-bar, a yoke connecting said rods, and a lever connected to said yoke and actuated by the movable cutter, substantially as specified.

4. The combination of the table *b*, stationary shear *c*, movable cutter *f*, clamping-bar *i*, rods *k*, springs *n*, yoke *m*, lever *q*, and rod *p*, substantially as specified.

5. The combination, in a machine for cutting paper, of a table or support for the paper, a self-acting clamping-bar, and means, substantially as specified, whereby said clamping-bar may, when desired, be held or relieved, so that its operation is temporarily suspended, substantially as set forth.

6. The combination, with a table, *b*, stationary shear *c*, movable cutter *f*, and clamping-bar *i*, of a rod, *t*, provided with legs adapted to enter recesses in the table, and said rod being capable of longitudinal movement, so that its legs may rest on the top of the table, outside of the said recesses, to uphold the clamping-bar in such position that it will not act in its ordinary manner.

7. The combination, with a table, a stationary shear, a movable cutter, a clamping-bar, and a rod, *t*, susceptible of a longitudinal movement, and provided with legs capable of entering recesses in a table or resting on the top of the table, of a spring for moving the said rod in one direction when not otherwise acted upon, and restoring the bar *t* to a normal position, substantially as set forth.

8. In a machine for cutting paper, a clamping-bar having a portion of the clamp adjacent to the cutter removed, so that light may be shed close to the shears, for the purpose set forth.

9. The combination of a stationary shear, a movable cutter, and an adjustable sheet-sustainer, substantially as specified.

10. The combination of a stationary shear, a movable cutter, and a detachable sheet-sustainer, substantially as specified.

11. The combination of a stationary shear, a movable cutter, a gage, and a sheet-sustainer supported by said gage, substantially as specified.

12. The combination of a stationary shear, a movable cutter, a gage, and an adjustable sheet-sustainer supported by said gage, substantially as specified.

13. The combination of a stationary shear, a movable cutter, an adjustable gage, and a sheet-sustainer carried by said gage, substantially as specified.

14. The combination of a stationary shear, a movable cutter, an adjustable gage, and an adjustable sheet-sustainer carried by said gage.

15. The combination of a stationary shear, a movable cutter, a gage, and a sheet-sustainer consisting of a cross-bar and rods extending therefrom and adjustably secured in said gage, substantially as specified.

Signed by me this 25th day of January, 1872.

CHAS. BROMBACHER.

Witnesses:

LEMUEL W. SERRELL,
HAROLD SERRELL.